United States Patent
Miller et al.

(10) Patent No.: US 10,163,134 B2
(45) Date of Patent: Dec. 25, 2018

(54) PLATFORM CONTENT MODERATION

(71) Applicant: Vivoom, Inc., Boston, MA (US)

(72) Inventors: Katherine Hays Miller, Boston, MA (US); John Clayton Webster, Flemington, NJ (US); Nicholas Joseph Nassar, Worcester, MA (US); Johnathan Paul Meyer, Boston, MA (US)

(73) Assignee: Vivoom, Inc., Boston, MA (US)

( * ) Notice: Subject to any disclaimer, the term of this patent is extended or adjusted under 35 U.S.C. 154(b) by 325 days.

(21) Appl. No.: 15/286,430

(22) Filed: Oct. 5, 2016

(65) Prior Publication Data

US 2017/0098255 A1    Apr. 6, 2017

Related U.S. Application Data

(60) Provisional application No. 62/237,422, filed on Oct. 5, 2015.

(51) Int. Cl.
 *G06Q 30/02* (2012.01)
 *G06F 17/30* (2006.01)

(52) U.S. Cl.
 CPC ..... *G06Q 30/0276* (2013.01); *G06F 17/3089* (2013.01); *G06F 17/30858* (2013.01); *G06F 17/30887* (2013.01)

(58) Field of Classification Search
 None
 See application file for complete search history.

(56) References Cited

U.S. PATENT DOCUMENTS

| | | | |
|---|---|---|---|
| 8,331,566 B1* | 12/2012 | Foote | H04L 67/2828 380/255 |
| 2005/0027594 A1 | 2/2005 | Yasnovsky et al. | |
| 2011/0145064 A1 | 6/2011 | Anderson et al. | |
| 2011/0191417 A1* | 8/2011 | Rathod | G06Q 30/02 709/204 |
| 2013/0282496 A1 | 10/2013 | Navarro et al. | |
| 2014/0108158 A1 | 4/2014 | Athsani et al. | |
| 2014/0279061 A1* | 9/2014 | Elimeliah | G06Q 50/01 705/14.72 |
| 2015/0169207 A1 | 6/2015 | Mody et al. | |
| 2016/0234147 A1* | 8/2016 | Joel | H04W 4/21 |
| 2016/0337291 A1* | 11/2016 | Park | H04L 51/14 |

OTHER PUBLICATIONS

"Startup Vivoom Aims to Help Brands Get Comfortable with User-Generated Content" (published at https://blogs.wsj.com/cmo/2014/09/22/startup-vivoonn-aims-to-help-brands-get-comfortable-with-user-generated-content/ online on Sep. 22, 2014).*

(Continued)

*Primary Examiner* — James M Detweiler
(74) *Attorney, Agent, or Firm* — Perkins Coie LLP

(57) ABSTRACT

Systems and methods for moderating branded content provided by users to an online content publishing and distribution network are described. In some embodiments, a content management system stores user-generated or user-created content, and creates and shares links associated to the user-generated content to online networks and other sites, where other users share, consume, and/or interact with the content (e.g., videos and other multimedia content).

20 Claims, 7 Drawing Sheets

(56) References Cited

OTHER PUBLICATIONS

"Image moderation made easy using cloud-based UI and API" (published online at https://cloudinary.com/blog/image_moderation-_made_easy_using_cloud_based_ui_and_api on May 16, 2014).*
International Search Report and Written Opinion for International Application No. PCT/US2016/055571, Applicant: Vivoom, Inc., dated Dec. 16, 2016, 13 pages.

* cited by examiner

PLATFORM CONTENT MODERATION

CROSS-REFERENCE TO RELATED APPLICATIONS

This application claims priority to U.S. Provisional Patent Application No. 62/237,422, filed on Oct. 5, 2015, entitled PLATFORM CONTENT MODERATION, which is hereby incorporated by reference in its entirety.

BACKGROUND

People want to be able to share their passions with friends and family. They would like to share their own user-generated content or media in ways that are compelling and interesting. There are many services today that allow users to record video, photo content, or other multimedia content, and upload the content to an Internet server, for sharing with a group of friends or family, as well as others over various network distribution channels, such as social networks.

Simultaneously, advertisers and sponsors look for new ways to reach viewers and other users; ways that are unobtrusive and yet build interest in, and awareness of, their brand and the products/services they provide. For example, certain brands attempt to align with user-created content, especially content that is shared amongst friends or other groups of users.

DETAILED DESCRIPTION

Overview

Figure 1:
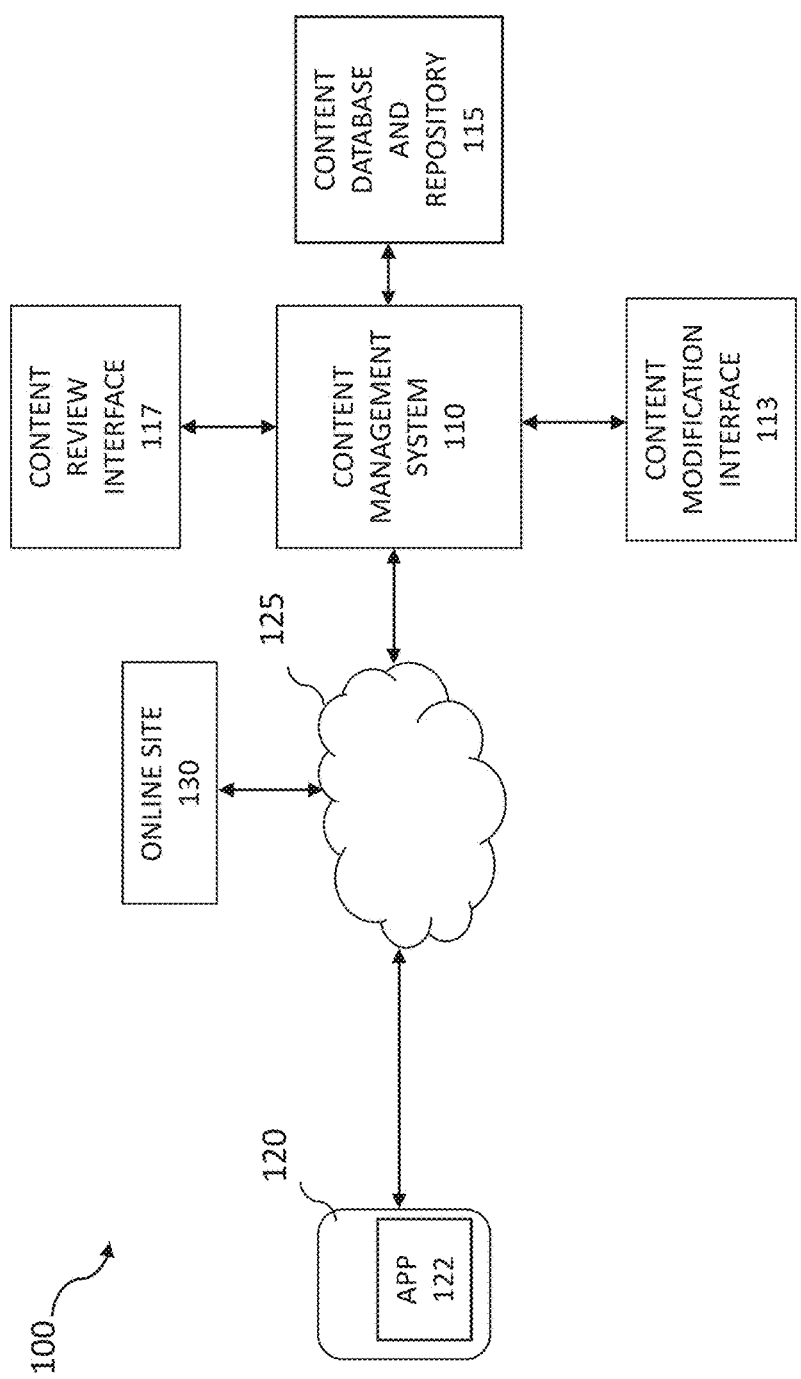
FIG. 1 is a block diagram illustrating a suitable computing environment for providing platform moderation of user-generated content.

Systems and methods for moderating content provided by users to an online content publishing and distribution network, are described. In some embodiments, a content management system stores user-generated or user-created content, and creates and shares links associated to the user-generated content to online networks and other sites, where other users share, consume, and/or interact with the content (e.g., videos and other multimedia content).

For example, the content management system may receive a user-generated video at a server of the content management system, store the user-generated video in a local database of the server, and share a post to a social network site that includes a uniform resource location (URL) to the user-generated video stored in the local database of the server.

Because the content management system stores and controls access to the user-generated content (e.g., "manages" the content in a "walled garden"), the content management system may implement various levels of moderation before and/or during the publication or distribution of the content to various online sites and services accessed by users.

For example, the content management system may implement and/or utilize public content moderation techniques, where the content management system moderates the content based on input from public users (e.g., users who have access to content), brand content moderation techniques, where the content management system moderates the content based on feedback received from a brand or other entity associated with the content (e.g., a brand having a product or service captured or promoted within the content), and so on.

In order to facilitate the moderation of received content on behalf of a brand, the content management system, upon initially receiving the content from a user device, may initiate a review period or window and perform two actions—a first action of providing placeholder content (unique or common) that is shared by the user to various target sites or users (e.g., Twitter, Facebook, over email, and so on), and a second action of providing the user-created content to a review tool that is accessible by the brand or entity associated with the content.

During the review period or window, the content management system provides the brand with access to the content via a content review interface, and/or may perform various automated actions in order to review the content. The content management system facilitates the receipt of input from the brand via the content review interface, and approves the content for sharing or other distribution. Once the content is approved, the review period ends, and the content management system replaces the placeholder content with the derived from the user.

For example, the systems and methods receive user-created content from a user device at a server of the content management system, and store the user-created content in a database associated with the server, wherein the database stores other user-created content and placeholder content that is pre-approved for posting within online networks. The systems and methods then cause an online network accessed by the user device to publish a post that includes a link to the placeholder content.

After a review of the content is finished, the systems and methods receive an indication that the user-created content has been approved for posting within the online networks, during the review of the received user-created content by a brand associated with the user-created content, and upon receiving the indication that the user-created content has been approved, revoke the link to the placeholder content from the published post, and insert a link to the user-created content in the published post.

Suitable Computing Environment

FIG. 1 is a block diagram illustrating a suitable computing environment 100 for platform moderation of user-generated content. The computing environment includes a server that supports the content management system 110, which communicates with a user device 120 over a network 125, such as the Internet.

For example, a student associated with the user device 125 may capture a video of his/her university campus, and upload the video via an application 122 associated with the content management system 110 to be stored by the content management system 110 in an associated database and repository 115.

The content management system 110 provides a content modification interface 113, which facilitates the user modifying his/her user-created or user-generated content with various display effects, such as effects associated with a specific brand (e.g., brand effects for the university).

The user provides input to the system 110 via the mobile application 122 requesting that the video is shared via one or more online sites 130, such as Twitter. For example, the input may be a generated tweet, which includes the video, some text, and a hashtag of "#myviewoftheU," which may be part of a social media campaign promoted by the student's university.

In response to the request to share the video, the content management system generates a link to the video, stores the video in the database 122, and provides the link to the user device 120. The user, via the user device 120, may then share the video to the online site 130 (or, initial placeholder content, to be described herein) and/or to other online sites, or via direct messaging to friends, contacts, other members of shared social networks, and so on. The content management system 110 may perform various moderation actions via the review interface 117, as described herein.

Figure 2:
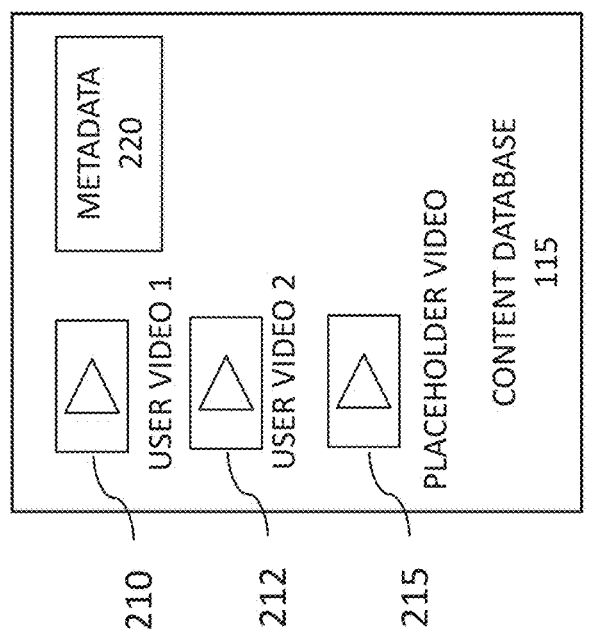
FIG. 2 is a block diagram illustrating the contents stored by a database of a content management system.

FIG. 2 is a block diagram illustrating the contents stored by the content database and repository 115 of the content management system 110. As described herein, the content database and repository 115 acts as a "walled garden" for user-provided (e.g., user-generated or user-created) content, where the content is locally stored within the database and repository 115, and maintained in the database and repository 115 when the content is shared by the user to various online locations or end users.

Database and repository 115 includes user content 210, 212, as well as placeholder content 215, which is pre-approved for distribution to online networks when user-created content is under review by one or more associated entities (e.g., an associated brand) in order to be approved for posting and/or sharing online. Furthermore, the database and repository 115 stores metadata 220 associated with the user-provided content 210, 212. The metadata 220 may include information associated with the content 210, 212, such as information identifying the owner or user, information associated with details about the content (e.g., content type, runtime, size, and so on), information identifying various effects applied by the user or the associated brand to the content, information identifying a moderation status for the content (e.g., "approved," "not approved," "under review," and so on), and other information.

Examples of User-Generated Content

As described herein, users may provide the content management system 110 with various types of content, such as video, audio, images, and so on. The following description provides various systems and methods that use, for example, location data, time data, social media actions (e.g., posting, liking, following, commenting) or social preferences (e.g., bands, teams, guilds, or people that a user follows on a social networking site or that the user has expressed an interest in) to deliver (e.g., in real time) targeted advertising content or media (e.g., logos, flying logos, flying banners, lower thirds, branded frames, voiceovers, sound overlays, pre- or post-rolls, composited items) that is then merged with user-generated media, forming a unified media object having greater value to users, advertisers, and content partners, such as a band, sports organization, performer, etc.

These unified media objects can then be shared to benefit all parties. Furthermore, the disclosed technology may also use location, time, and/or social data to deliver (e.g., in real time) targeted visual or audio effects (or treatments) to be used to modify and enhance such user-generated media prior to sharing it. This platform has the benefit that the effects applied are more relevant and engaging to both the user and the viewers of the user's content, prompting the user to continue using the service and prompting viewers to view the content, view the content for longer, and give the user positive social feedback (e.g., "likes" or comments on the user's content). This in turn may drive additional advertising or other revenue, by increasing the number of users and/or increasing the number of views and re-shares of the resulting content.

In some examples, content is merged with ad media using "client side processing." In these examples, the client receives the ad media and merges the ad media with the user-generated media. For example, the ad media may take the form of a semi-transparent logo, frame, or identifying mark that the client can composite onto the user-generated media, using e.g. any standard compositing operator, such as OVER, PLUS, or SCREEN. The client can then send the final composited media to the server or directly to a sharing service.

In some examples, content is merged with ad media using "server side processing." In these examples, the client transmits the user-generated media and location and/or social data to the server. The server composites, prepends, appends, and/or otherwise integrates the ad media onto the user-generated media, using, e.g., any standard compositing operator, and sends the final composited media to a sharing destination.

In the case of video, the ad media is typically also video but may also contain audio. The video tracks are merged by compositing, and the audio tracks are merged by mixing, appending, prepending and/or replacing the audio tracks. In the case of audio only, the tracks are merged by mixing them together. In the case of photo media, the ad media is also a still image, with optional transparency; the ad is overlaid over the user's photo.

In some examples, the ad media may not be simply a fixed set of frames with an optional compositing method; it may also contain one or more video or audio effects to be applied to the user-generated media and/or the ad media in order to integrate them into the final shareable product. For example, the ad media may be a partially transparent logo, and the effect may be computer instructions to blur an image and/or move the logo across a screen for artistic effect, while compositing the logo over the user-generated media. As another example, the ad media may be a logo, and the effect may instruct the system to simulate embossing the logo onto the user-generated media. In some cases, the effect may itself be the ad media; no other frames or content may be needed. For example, the effect may be an effect to make a user's video look more professional, like a popular music video. In some examples, the effects are resolution-independent, multithreaded, fully anti-aliased, resistant to popping, resistant to jitter, without errant edge effects, and/or contain fully floating point internals. As a result, the user may be more willing to endure a delay in the posting of her video if she knew that the resulting video was an improved/enhanced one.

Ad media and effects can be delivered or targeted to a user based on a combination of the user's geographical location (latitude and longitude), current time and date, local scheduling information, weather, demographics, social media preferences or status, social media actions, and/or other information about the user, if any, and so on, based on a campaign configuration or profile specified by the advertiser or effects sponsor. For example, a user who is in a particular stadium during a particular soccer game could be delivered ad content or effects relevant to the teams playing in the game, an upcoming game, or a particular advertiser or event sponsor, such as an advertisement for the home team's sponsor or an effect to replace colors in an image or video with the home team's colors.

As another example, a user who is in a concert venue during or soon after a particular concert could be delivered ad content or effects relevant to the artist, the venue, or similar artists, such as an advertisement for the artist's new album or an effect used in a recent music video by the artist. As another example, a 21-year old male at a festival may be delivered different ad media or effects than a 35-year-old female at the same location and time. As another example, a user who enters or approaches a popular coffee chain may be offered content or effects based on his/her social media preferences as well as the location. In some examples, a user may be notified that she has received or unlocked one or more effects or pieces of advertising media when the user enters a particular venue or performs a particular social activity or action, such as liking or commenting on a content sponsor's media post.

As descried herein, the system employs a client device (which may be a mobile phone, tablet, desktop computer, wearable device, etc.) and a server connected via a network (e.g. cell network or Internet). Software on the client device enables recording, storage, modification, uploading, and sharing of media. The server can mediate between the client device and the user's desired sharing services, such as Facebook, Twitter, Tumblr, Google+, or others. The server software delivers ad media to the client, and in some embodiments performs the integration of ad media and user-generated media. A user uses the client device to record media content (e.g., recording a video, taking a photo, recording audio). The recording may be done via the client software or other third party software. The client software then enables the modification, ad integration, and sharing of the content via, for example, a social networking site.

In some examples, prior to sharing the content in a social network, website or other Internet property, the user's location is determined (e.g., using GPS, cell phone tower proximity, proximity sensing systems such as iBeacons, or proximity to Wi-Fi access points) and transmitted to the server. The client and server may determine, location, based on the user's account information (if any), as well as time, date, social data retrieved from the user's social networks or other sources, a set of relevant location-based advertising content and/or effects to be integrated with the user's media, and other factors. For each of these relevant pieces of advertising content and/or effects (e.g., "results") the server software delivers a description and zero or more thumbnail samples of the results to the client. The server may then apply selected results (e.g., composite a selected piece of advertising content or effect with user-generated media), or query the user to determine which of several applicable results to apply.

In some examples, the server may deliver a description and one or more thumbnail samples of the desired pieces of advertising content and/or effects to the client and the user can select which to apply. After the media is integrated, the integrated media is transmitted to the sharing destination, e.g. Facebook, Twitter, Tumblr, Google+, or others, such as a friend via email or SMS or MMS message, either directly from the client or via the server or download and store the media. In an alternative embodiment, the server may transmit to the client instructions for applying the relevant effects and/or integrating the relevant pieces of advertising content. The client then processes the effects on the video locally. The client can then share the resulting media directly to a sharing destination or download and store the media.

Receiving geographic coordinates via Wi-Fi is much more precise than those from cell phone tower geo proximity systems. Coordinates obtained from cell towers make use of signal strength and triangulation, both of which can be limited in, for example, rural and urban locations. In some examples, these drawbacks can make obtaining precise geographic coordinates impossible, inaccurate, or simply take an unacceptable amount of time. For this reason, the disclosed system detects whether a client is obtaining geographic coordinates via a cell tower instead of Wi-Fi, the geo fencing border is extended based on that deficiency and may be scaled by precision to a limit of, for example, 200 meters.

The content generation system may include a client, a server, a sharing service, a user database, and a campaign database. The campaign database stores advertising and effects/treatment information for each of one or more campaigns, such as an advertising campaign, an effects campaign, and so on. Furthermore, each campaign may be associated with additional targeting information, such as user demographic information, time restraints or conditions, social media/networking actions, and so on. The client logs into the server using, for example, a user name and password previously established with the server. Each user's account information can be stored in user database, along with user profile information, such as the user's name, preferences, interests, affinities, history, and so on. If the user has not established an account, the server may prompt the user to do so. The client retrieves location information for the client, such as geographic coordinates.

In some examples, the location information may be coarse or roughly estimated based on available information, such as signal strength, estimated distances from signal towers, and so on. As another example, the client may use geo-fencing information to determine whether the client is within a geo-fenced area. The client sends the location information to the server. The server looks up and selects advertising content and/or effects information based on, for example, the location information and the day/time.

For example, the advertising/effects database may map location and day/time information to advertisements and/or effects. In this manner, an effect to accentuate the lighting of the Eiffel Tower at night may be selected for users generating content near the Eiffel Tower at night. Similarly, a sepia effect may be selected for users generating content near an old "wild wild west" town or a ghost town. Furthermore, an entity (such as a sports team or an artist (or their representatives)) can target advertisements and/or effects to users who are present at a particular location or venue during a certain time. As an example, a football team and/or one of its sponsors, may establish and register certain pieces of advertisements or effects to be provided to users generating content during a football game if those users are at or near the football game.

In some cases, different pieces of advertising content or effects may be made eligible based on the current score of the game, an in-game achievement performed by a player (e.g., touchdown or interception), and so on. As another example, fans of a particular artist may be eligible to incorporate unique advertising content or effects into user-generated media if they are present at one of the artist's concerts.

Many other examples are possible. For example, only users who have performed some earlier action will have access to certain effects or content. For example, some content may be made available only to users who have previously posted acceptable content for a brand. As another example, users who are season ticket holders, users who have attended three or more games, users who have purchased a certain monetary amount or quantity of goods, etc. will have access to such restricted content/effects.

The system may also include advertising content or effects that are unique to a particular song performed by the artist during the concert. In this manner, the user can publicize or announce to their followers and others that they are at a particular event using advertisements or effects unique to that event, which may encourage users to attend the event and increase ticket sales. Furthermore, the entities are encouraged to produce advertising content and effects unique to certain events or shows so that users can obtain and include these elements in their user-generated media. The server retrieves the advertising content and/or effects. The server identifies campaigns that are associated with locations near the location of the client and provides an indication of those nearby campaigns to the client.

For example, the server may identify all of the campaigns associated with locations within a threshold distance from the client, such as 100 feet, 1 mile, 50 kilometers, and so on. In some examples, the server may provide the client with one or more content keys to access the campaign(s). The client gets precise geographic coordinates by, for example, obtaining GPS coordinates. The client unlocks the campaign or campaigns that match all criteria and presents welcome information in the client. The client records or imports user-generated media, such as video, image(s), and/or audio clip(s). The client sends the user-generated media, such as an image, video, or audio recording, to the server. The treatment associated with the campaign is applied automatically or as selected by the user.

Example System Operation

The following details illustrate the processing of a social action-based enhancement component of a server system in accordance with some examples of the disclosed technology. The component is invoked by a server system to have user-generated media enhanced and shared based on social action information. The component identifies a user based on, for example, a username and/or password received from a client device. The component determines actions associated with the identified user. For example, the component may retrieve the actions from a data store maintained by the server system.

As another example, the component may access one or more social networking sites accessed by the user to determine social actions performed by the user on those social networking sites. In some examples, the component may receive the actions from a client device that is associated with the user and that maintains a log of actions performed by the user. The component identifies campaigns associated with criteria that are satisfied by the determined actions.

For example, a campaign may be associated with criteria specifying that a user needs to "follow" a particular account or accounts, such as the accounts of a particular artist or band, or criteria specifying that a user must have posted a message containing a particular hash tag during the last hour.

As another example, a campaign may be associated with criteria specifying that a user must have tagged a particular user or account in a post (e.g., identifying the particular user or account in the post). The component sends an indication of the identified campaigns to the client device. The component receives a selection of one or more campaigns and settings for associated configuration information. The component receives user-generated media, such as an image, video, or audio. The component generates a preview based on the user-generated media and the selected campaign(s) by applying the treatments/enhancements associated with the selected campaigns to the user-generated media in accordance with the received settings. The component sends the preview to the client device. The component finalizes the content. The component sends the finalized content, or a URL link to the finalized content, to the client device. Although the component above is described as enhancing user-generated media based on social actions, one of ordinary skill in the art will recognize that campaigns can be selected for a user or device based on information other than, or in addition to, social actions, such as location information, time data, social preferences, and so on.

Examples of Content Sharing and Moderation

Figure 3A:
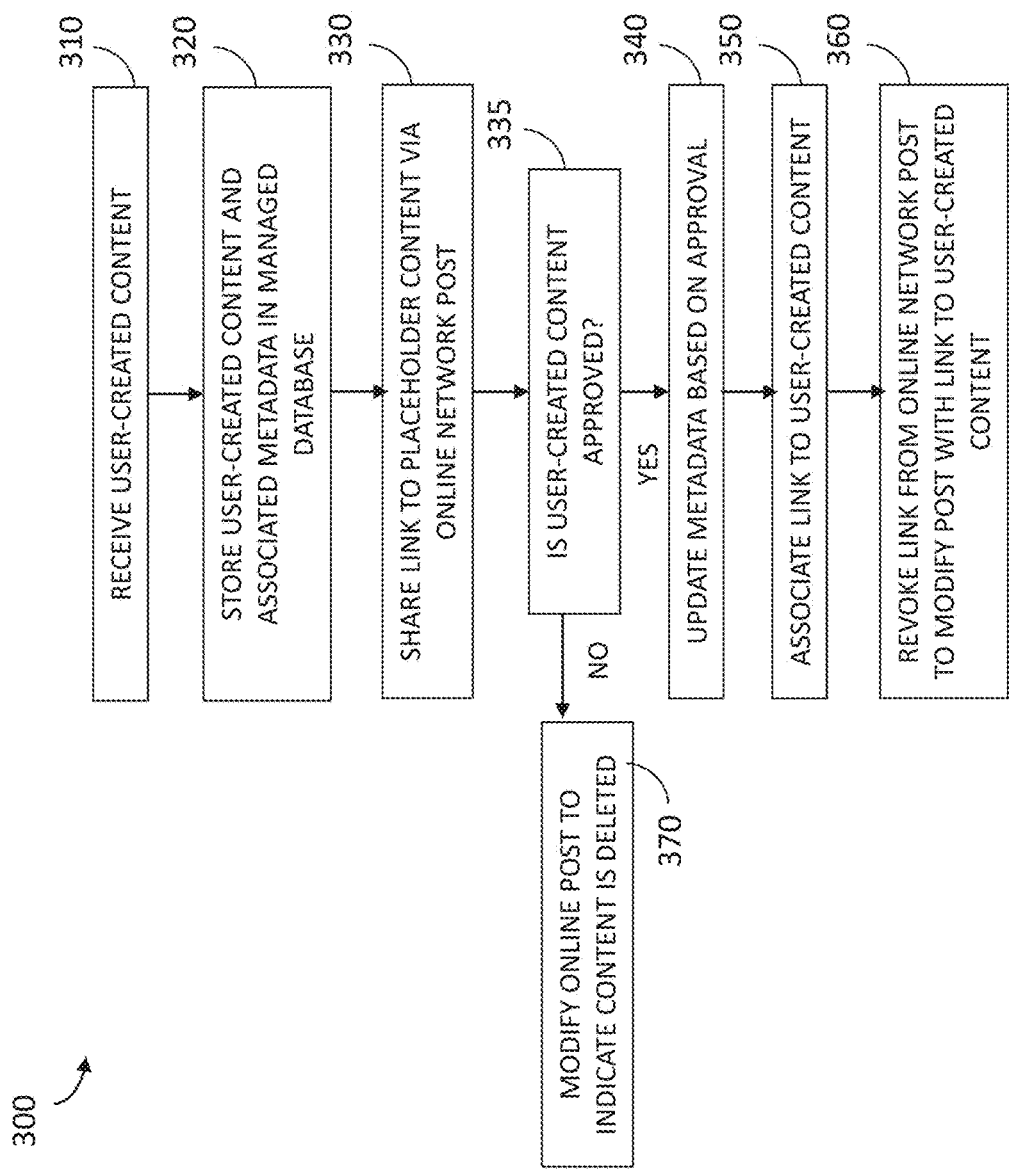
FIG. 3A is a flow diagram illustrating a method of moderating user-generated content before the content is posted to online networks.

As described herein, the content management system 110 may apply various levels of moderation to user-generated content. FIG. 3A is a flow diagram illustrating a method of moderating user-generated content, such as "strict" or brand-specific moderation. The method 300 may be performed by the content management system 110, and, accordingly, is described herein merely by way of reference thereto. It will be appreciated that the method 300 may be performed on any suitable hardware.

In operation 310, the content management system 110 receives user-created content from a user device at a server of the content management system 110. For example, the system 110 may receive user-created content via the content modification interface 113, which applies, or causes to be applied, various brand effects to the user-created content.

In operation 320, the system 110 stores the user-created content (and associated metadata) in the database and repository 115 associated with the server, wherein the database and repository 115 stores other user-created content 210, 212, and placeholder content 215 (described herein) that is pre-approved for posting within online networks.

In operation 330, the system 110 causes an online network accessed by the user device to publish a post that includes a link to the placeholder content. For example, the system 110 may receive input from the user to post his/her video to a social network. Because the content has not yet been reviewed, the system 110, as described herein, accesses and includes the link to the placeholder content 220 within the post to the social network.

Figure 4B:
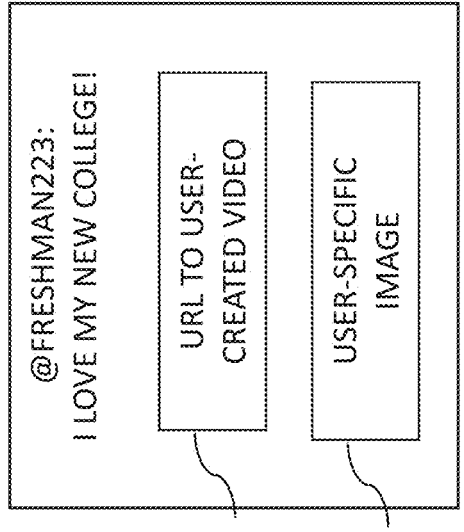
FIGS. 4A and 4B are diagrams illustrating posts shared by the content management system.
Figure 4A:
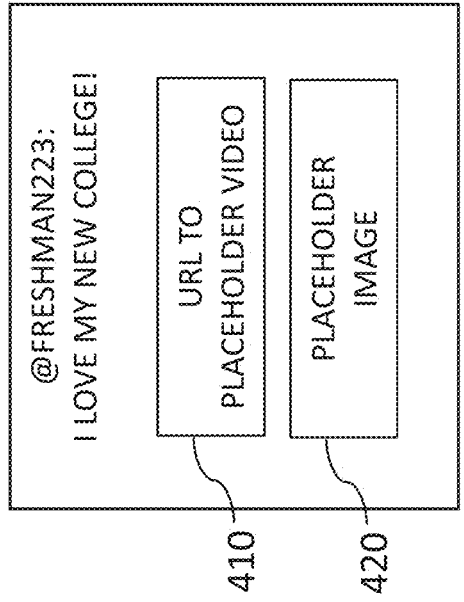

FIG. 4A illustrates a post 400 shared by the content management system 110 that includes a link to placeholder content. The initial post includes a URL 410 and image 420 to the placeholder content 220 stored in the database and repository 115. The placeholder content can be from and approved by the brand, and may let the user know that her video is being analyzed and enhanced before being posted, to thereby let the user know the status of her post.

Referring back to FIG. 3A, in operation 335, the system 110 determines whether the user-created content has been approved for distribution. For example, the system 110 may communicate with the content review interface to determine whether the content has been approved by a brand or other entity associated with the content (e.g., an entity or brand highlighted or otherwise referred to within the content).

In operation 340, upon receiving an indication that the received user-created content has been approved for posting within the online networks during the review of the received user-created content by a brand associated with the user-created content, the system 110 updates metadata associated with the user-created content (e.g., updates metadata 220).

In operation 350, the system 110, in response to the approval (e.g., via the updated metadata) revokes the link to the placeholder content from the published post. For example, the system 110 may call a revoke API to remove and/or replace the link and image to the placeholder content 220 from the published post.

In operation 360, the system 110 causes the user-created content in the published post to be revoked within the social environment application, which updates the URL 410 and image 420 to become the URL 460 and image 470. The user video 210 in the content database and repository 115 may be changed directly before being revoked, such that the URL 410 and 420 are the same, but no longer point to the same content. The social network update occurs, and the approved new image 470 and effective URL 460 exist in the published social post.

FIG. 4B illustrates the post 400 shared by the content management system 110, with a link to the user-created content. The post, after the content has been approved, now includes a user-derived image 470 and URL 460 to the user-derived branded content 210 stored in the database and repository 115. Referring back to operation 335 of FIG. 3A, when the system 110 determines the user-created content has not been approved for distribution, the system 110, in operation 370, deletes the link to the placeholder content from the published post. In some cases, the system may insert different placeholder content, such as content that identifies the content has been deleted or not approved. The system 110 may also send information to the user that identifies the reasons for not approving the content.

Thus, the content management system 110, when applying strict moderation to user-generated content, facilitates the sharing of the content by the user while also providing a review period for the brand, enabling the brand to review any unknown content that is associated with the brand before it is publically available and/or shared with other users via online sites and social media platforms.

Of course, in some embodiments, the system 110 may share user-created content without requiring explicit approval by an associated entity or brand. For example, the system 110 may apply different levels of moderation to different users, types of content, and so on.

Figure 3B:
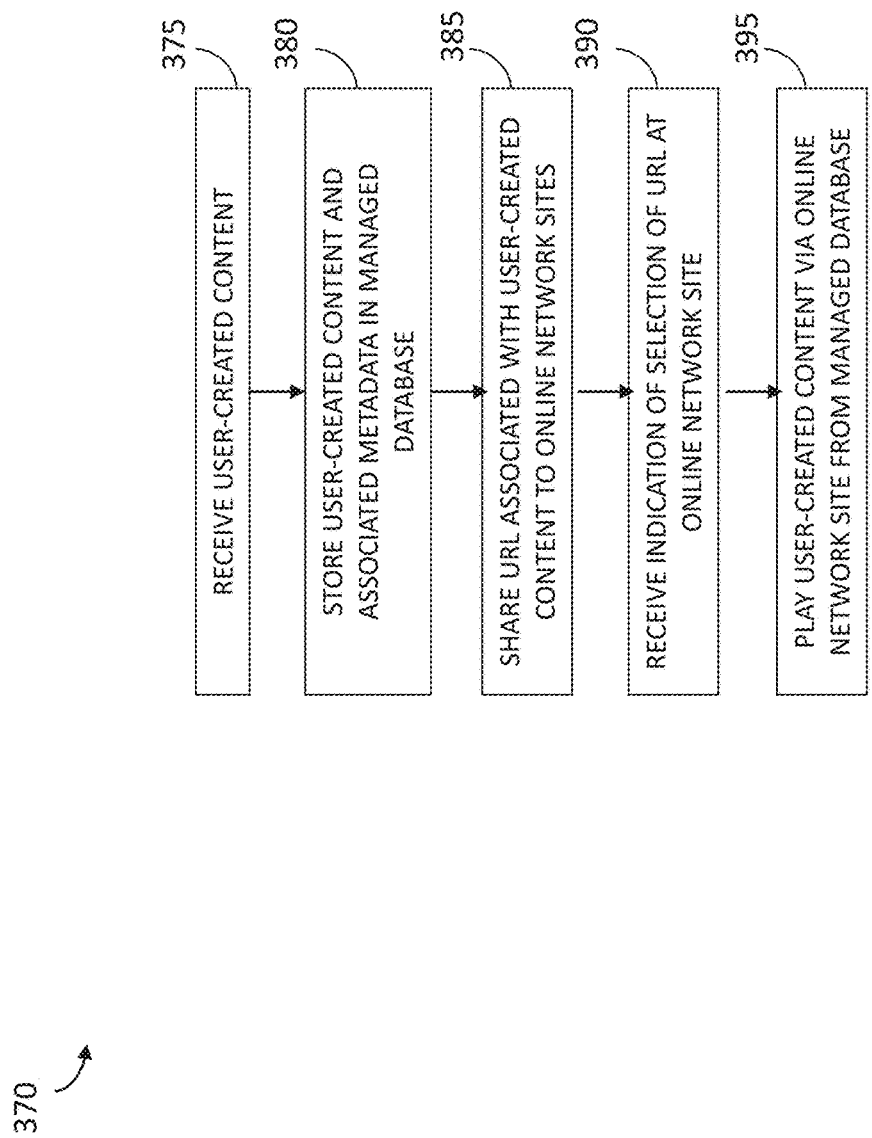
FIG. 3B is a flow diagram illustrating a method of sharing user-generated content to online network sites.

FIG. 3B is a flow diagram illustrating a method 370 of sharing user-generated content to online network sites. The method 370 may be performed by the content management system 110, and, accordingly, is described herein merely by way of reference thereto. It will be appreciated that the method 370 may be performed on any suitable hardware.

In operation 375, the content management system 110 receives user-created content from a user device at a server of the content management system 110. For example, the system 110 may receive user-created content via the content modification interface 113, which applies, or causes to be applied, various brand effects to the user-created content.

In operation 380, the system 110 stores the user-created content (and associated metadata) in the database and repository 115 associated with the server, wherein the database and repository 115 stores other user-created content 210, 212.

In operation 385, the system 110 shares a URL associated with the user-created content to one or more online network sites. For example, the system 110 calls the create URL API to generate and share a link to the user-created content, stored in the walled garden of the database and repository 115, within posts to online network locations.

Later, in operation 390, the system 110 receives an indication that the URL to the user-created content has been selected by a user at an online network site for playback, and in operation 395, causes the social network site to play back the video from the local database 220 of the server.

Thus, in some embodiments, the system 110 facilitates the sharing of content to various online network sites or end users without transmitting the actual content to the different sites or users. Instead, as described herein, the system 110 maintains and manages all received content, and provides links to the content, which enable users to playback or otherwise view the shared content.

Thus, in some embodiments, all videos and other multimedia content is hosted by the content management system 110, such as within cloud storage (e.g., database and repository 115). For example, videos shared to Facebook, Twitter, SMS, and email, are all links back to the system 110. Maintaining the content within control of the system 110 enables the system 110 to improve the quality of user video when the user device 120 uploads an HD original video, changes, reprocesses, or modifies a video template (e.g., the outro or ending video may be displayed, content is moderated), and so on.

With respect to moderation, the system 110 may enable what is inappropriate content to be defined by the brand and/or the system 110, wherein the inappropriate content may include all content defined as inappropriate by posted Content Guidelines Policy and Terms of Service of the system 110, as well as the guidelines set by the brand. Examples of inappropriate content that may not be approved by the system 110 include "Inappropriate graphic content", "Harmful or objectionable content", "Spam", "Copyright violation", "Unapproved people in video", and so on.

In some cases, the system 110 supports conservative content moderation policies for internet video. Similar to most public web services with user-generated content, all users (e.g., video watchers) may flag a video for "inappropriate content". When a user flags a video, that video, in some cases, is immediately and automatically removed from the public, and assigned to the system 110 for internal review. Placeholder content, as described herein, may replace the video during the review process. Once approved (or, otherwise reviewed), the system 110 may remove the placeholder content (as described herein), and replace the user-created content.

In some cases, the system 110 may maintain content at online network sites, regardless of whether other users have flagged the video. For example, If the video has been curated and approved by a brand partner, then the video will stay visible if someone in the public flags it as inappropriate, and/or if the video has previously been flagged as inappropriate but was reinstated the video will stay visible.

Figure 5:
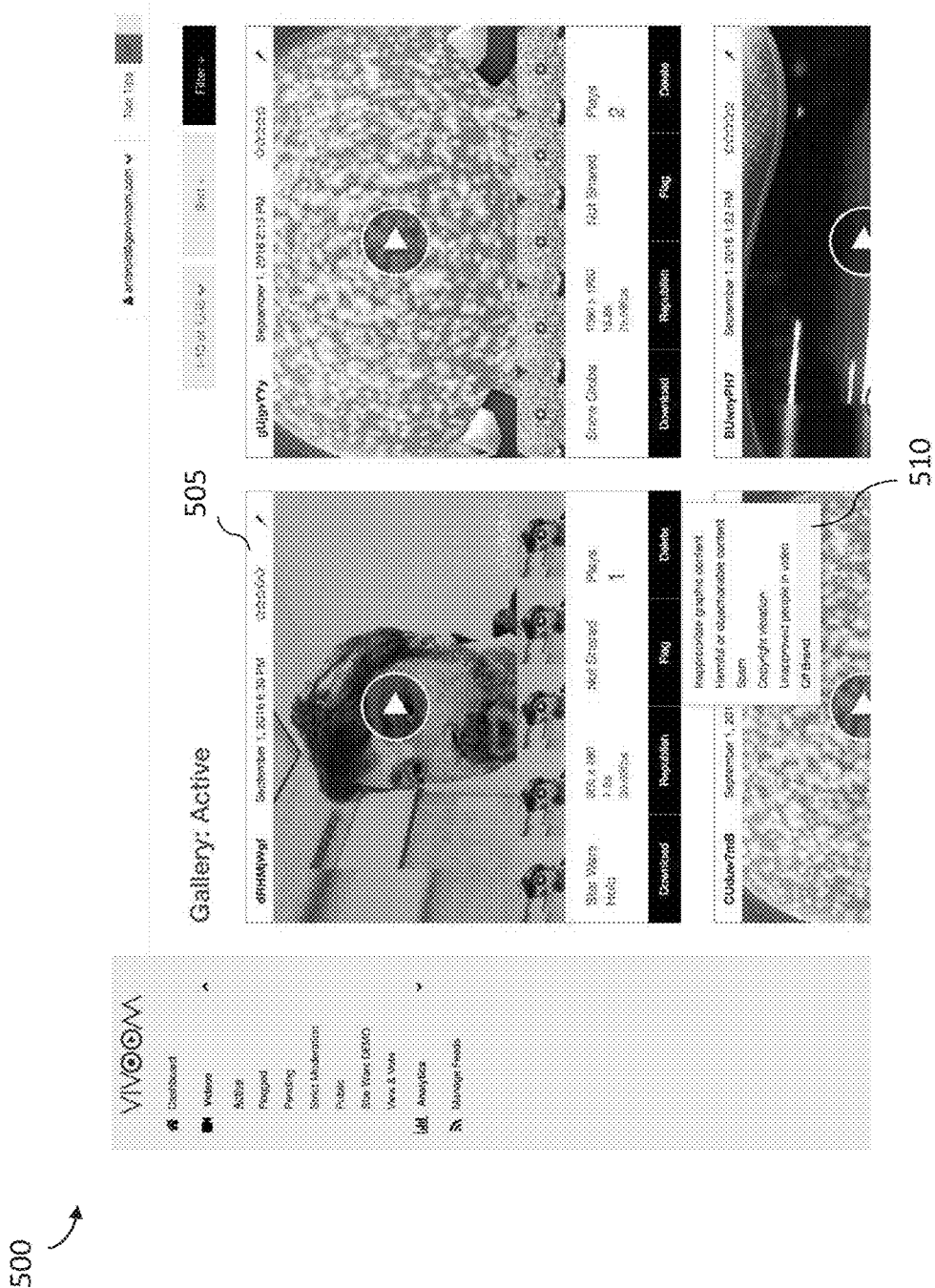
FIG. 5 is a display diagram illustrating an example user interface configured to facilitate the review of user-generated content.

As described herein, the system 110 provides a user interface to view some or all videos created in a campaign. FIG. 5 is a display diagram illustrating an example user interface 500 configured to facilitate the review of user-generated content. Within this portal, videos 505 may also be flagged for inappropriate content (menu 510). Upon doing so, the video may be immediately removed from the public, and assigned to the system 110 to review against the Terms of Service and campaign guidelines. Again, placeholder content may be inserted, when appropriate.

In some embodiments and as described herein, some or all user co-created campaign content may be reviewed before being visible to anyone but the creator and the brand running the campaign. This is intended to protect the brand and its affiliates from inappropriate use and brand association. For example, the user proceeds through the application 122 in the normal manner without change; they unlock the campaign, login/register (if they have not), shoot or load video, see the video preview, approve or reshoot it, share it, and see and even play back the video.

Thus, as described herein, the system 110 facilitates the sharing of content by URL reference, and prevents content from being ingested into 3rd party networks. The system 110, therefore, receives direct analytics and can alter the content, such as hide, delete, un-hide, upgrade SD to HD, modify, add effects, present placeholder content, and so on, among other benefits.

CONCLUSION

Figure 6:
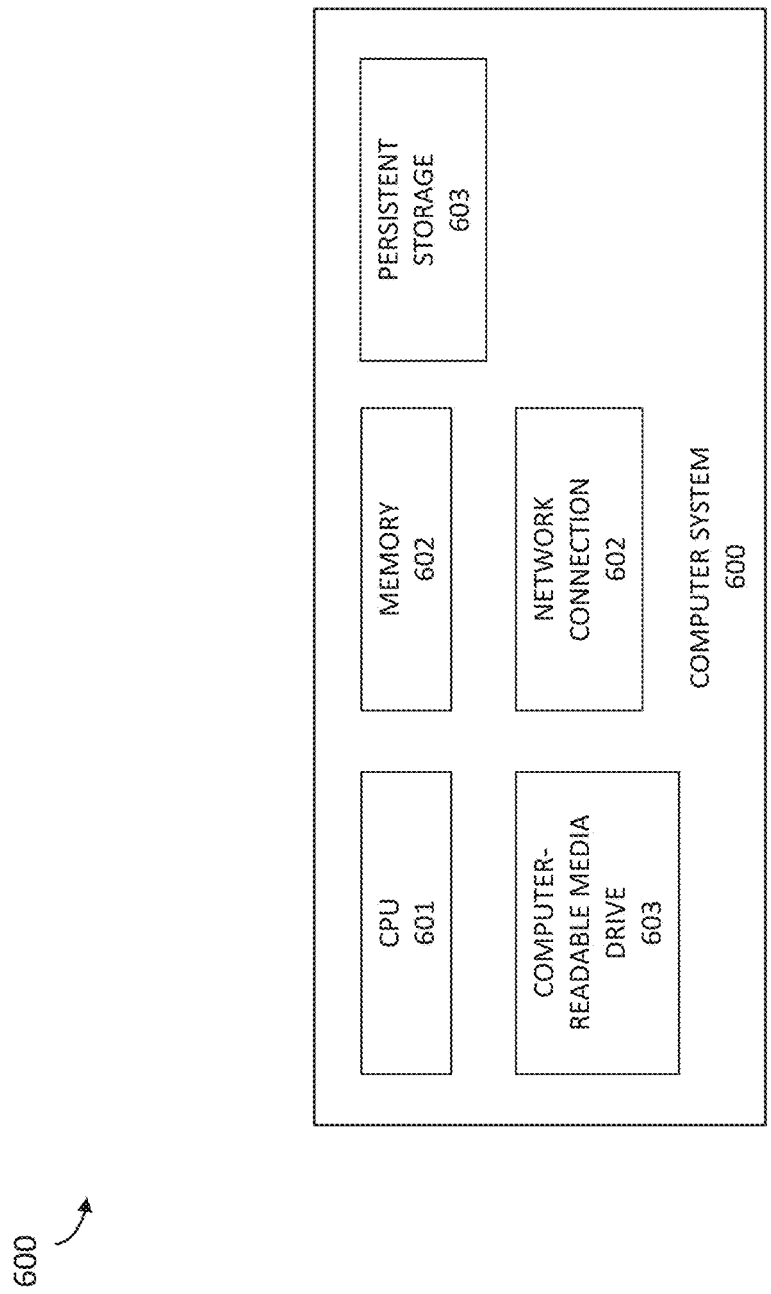
FIG. 6 is a block diagram illustrating some of the components that may be incorporated in at least some of the computer systems and other devices on which the facility operates and with which the facility interacts.

FIG. 6 is a block diagram illustrating some of the components that may be incorporated in at least some of the computer systems and other devices on which the system operates and with which the system interacts in some examples. In various examples, these computer systems and other devices 600 can include server computer systems, desktop computer systems, laptop computer systems, netbooks, tablets, mobile phones, personal digital assistants, televisions, cameras, automobile computers, electronic media players, and/or the like. In various examples, the computer systems and devices include one or more of each of the following: a central processing unit ("CPU") 601 configured to execute computer programs; a computer memory 602 configured to store programs and data while they are being used, including a multithreaded program being tested, a debugger, the facility, an operating system including a kernel, and device drivers; a persistent storage device 603, such as a hard drive or flash drive configured to persistently store programs and data; a computer-readable storage media drive 604, such as a floppy, flash, CD-ROM, or DVD drive, configured to read programs and data stored on a computer-readable storage medium, such as a floppy disk, flash memory device, a CD-ROM, a DVD; and a network connection 605 configured to connect the computer system to other computer systems to send and/or receive data, such as via the Internet, a local area network, a wide area network, a point-to-point dial-up connection, a cell phone network, or another network and its networking hardware in various examples including routers, switches, and various types of transmitters, receivers, or computer-readable transmission media. While computer systems configured as described above may be used to support the operation of the facility, those skilled in the art will readily appreciate that the facility may be implemented using devices of various types and configurations, and having various components. Elements of the facility may be described in the general context of computer-executable instructions, such as program modules, executed by one or more computers or other devices. Generally, program modules include routines, programs, objects, components, data structures, and/or the like configured to perform particular tasks or implement particular abstract data types and may be encrypted. Moreover, the functionality of the program modules may be combined or distributed as desired in various examples. Moreover, display pages may be implemented in any of various ways, such as in C++ or as web pages in XML (Extensible Markup Language), HTML (HyperText Markup Language), JavaScript, AJAX (Asynchronous JavaScript and XML) techniques or any other scripts or methods of creating displayable data, such as the Wireless Access Protocol ("WAP"). Typically, the functionality of the program modules may be combined or distributed as desired in various embodiments, including cloud-based implementations.

The following discussion provides a brief, general description of a suitable computing environment in which the invention can be implemented. Although not required, aspects of the invention are described in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other computer-readable storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Furthermore, the term computer-readable storage media does not encompass signals (e.g., propagating signals) or transitory media.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples; alternative implementations may employ differing values or ranges. Furthermore, although certain steps, functions, or functionalities may be described herein as being performed by or at a particular device, various steps, functions, functionalities, or portions thereof, may be performed at other devices. For example, display previews may be generated at a server or client device.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. In some cases, various steps in the algorithms discussed herein may be added, altered, or removed without departing from the disclosed subject matter. Those skilled in the art will appreciate that features described above may be altered in a variety of ways. For example, the order of the logic may be rearranged, sublogic may be performed in parallel, illustrated logic may be omitted, other logic may be included, etc.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for," but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. A non-transitory computer-readable medium storing computer-executable instructions that, when executed by a content management system, cause the content management system to perform a method for providing user-created content to one or more online networks, the method comprising:
    receiving, from a computing system associated with a brand, placeholder content that is pre-approved for posting to the one or more online networks;
    storing the placeholder content in a database;
    receiving user-created content at a server of the content management system, wherein the user-created content is received from a user device;
    storing the user-created content in the database, wherein the database stores other user-created content
    following the receiving of the user-created content, sending the user-created-content, to a review interface accessible by a computing system associated-with one or more moderators associated with the brand, to facilitate a-review of the received user-created content by the one or more moderators;
    prior to causing the one or more online networks to publish a post that includes a-link to the user-generated content, and prior to receiving an indication that-the user-created content has been approved for posting within the one or-more online networks, causing one online network to publish a post that includes a first link to the placeholder content, wherein the published post is available to one or more users, of the online-network, other than a user who created the user-created content;
    receiving an indication that the user-created content has been approved-for posting within the one or more online networks, wherein the indication of approval occurs after the review of the received user-created content by the one or more moderators-associated with the brand; and upon receiving the indication that the user-created content has been approved, making one or more calls to one or more Application Programming Interfaces (APIs) to remove or revoke, from the published post, the first link to the placeholder content and to add, in the published post, a second link to the user-created content, wherein the second link is different from the first link.

2. The non-transitory computer-readable medium of claim 1, wherein the method further comprises:
modifying the user-created content with one or more visual or audible effects related to the brand.

3. The non-transitory computer-readable medium of claim 1, wherein the method further comprises:
storing metadata associated with the user-created content in the database, wherein the stored metadata includes metadata identifying one or more brand effects applied to the user-created content and information identifying an approval status assigned to the user or the user-created content; and
upon receiving the indication that the user-created content has been approved, updating the information identifying the approval status assigned to the user-created content to indicate the approval of the user-created content for posting within the one online network.

4. The non-transitory computer-readable medium of claim 1,
wherein the user-created content is a user-created video created by the user device.

5. The non-transitory computer-readable medium of claim 1,
wherein the second link is a uniform resource location (URL) created by a link generator of the content management system.

6. A method, comprising:
receiving, from a computing system associated with a brand, placeholder content that is pre-approved for posting to one or more online networks;
storing the placeholder content in a database;
receiving user-created content at a server of a content management system, wherein the user-created content is received from a user device;
storing the user-created content in the database, wherein the database stores other user-created content;
following the receiving of the user-created content, sending the user-created content, to a review interface accessible by a computing system associated with one or more moderators associated with the brand, to facilitate a review of the received user-created content by the one or more moderators;
prior to causing the one or more online networks to publish a post that includes a link to the user-generated content, and prior to receiving an indication that the user-created content has been approved for posting within the one or more online networks, causing one online network to publish a post that includes a first link to the placeholder content, wherein the published post is available to one or more users, of the online network, other than a user who created the user-created content;
receiving an indication that the user-created content has been approved for posting within the one or more online networks, wherein the indication of approval occurs after the review of the received user-created content by the one or more moderators associated with the brand; and
upon receiving the indication that the user-created content has been approved, making one or more calls to one or more Application Programming Interfaces (APIs) to remove or revoke, from the published post, the first link to the placeholder content and to add, in the published post, a second link to the user-created content, wherein the second link is different from the first link.

7. The method of claim 6, further comprising:
modifying the user-created content with one or more brand effects.

8. The method of claim 6, further comprising:
storing metadata associated with the user-created content in the database, wherein the stored metadata includes metadata identifying one or more brand effects applied to the user-created content and information identifying an approval status assigned to the user-created content; and
upon receiving the indication that the user-created content has been approved, updating the information identifying the approval status assigned to the user-created content to indicate the approval of the user-created content for posting within the one or more online networks.

9. The method of claim 6,
wherein the user-created content is a user-created video.

10. The method of claim 6,
wherein the second link is a uniform resource location (URL) created by a link generator of the content management system.

11. The method of claim 6,
wherein the one or more online networks include social networks, microblog networks, or messaging platforms.

12. A content management system, comprising:
at least one processor;
data storage coupled to the at least one processor; and
one or more hardware or software modules executable by the at least one processor, wherein the one or more hardware or software modules are configured to:
receive, from a computing system associated with a brand, placeholder content that is pre-approved for posting to one or more online networks;
store the placeholder content in the data storage;
receive user-created content, wherein the user-created content is received from a user device;
store the user-created content in the data storage, wherein the data storage stores other user-created content;
following the receiving of the user-created content, send the user-created content, to a review interface accessible by a computing system associated with one or more moderators associated with the brand, to facilitate a review of the received user-created content by the one or more moderators;
prior to causing the one or more online networks to publish a post that includes a link to the user-generated content, and prior to receiving an indication that the user-created content has been approved for posting within the one or more online networks, cause one online network to publish a post that includes a first link to the placeholder content, wherein the published post is available to one or more users, of the online network, other than a user who created the user-created content;
receive an indication that the user-created content has been approved for posting within the one or more online networks, wherein the indication of approval occurs after the review of the received user-created content by the one or more moderators associated with the brand; and upon receiving the indication that the user-created content has been approved, make one or more calls to one or more Application Programming Interfaces (APIs) to remove or revoke, from the published post, the first link to the placeholder content and to add, in the published post, a second link to the user-created content, wherein the second link is different from the first link.

13. The content management system of claim 12, wherein the user-created content is a user-generated video, wherein the online network is a the social network site, and wherein the one or more hardware or software modules are further configured to:

receive an indication that the second link to the user-generated video has been selected for playback, by a user, within the social network site; and cause the social network site to play back the user-generated video from the data storage.

14. The content management system of claim 12, wherein the online network is a social network site, and wherein the user-created content is a user-created video.

15. The content management system of claim 12, wherein the one or more hardware or software modules are further configured to:

store metadata associated with the user-created content, wherein the stored metadata includes metadata identifying one or more brand effects applied to the user-created content and information identifying an approval status assigned to the user-created content.

16. The content management system of claim 12, wherein the user-created content is a user-generated video and wherein the one or more hardware or software modules are further configured to:

modify the user-created video with one or more brand effects.

17. The content management system of claim 12, wherein the post further includes an image related to the user-generated content or to the placeholder content.

18. The method of claim 6, wherein the placeholder content comprises one or more of: an image, video content, or any combination thereof.

19. The method of claim 6, wherein the approved user-generated content comprises one or more of: an image, video content, or any combination thereof.

20. The non-transitory computer-readable medium of claim 1, wherein the post further includes an image related to the user-generated content or to the placeholder content.

* * * * *